United States Patent Office 3,424,754
Patented Jan. 28, 1969

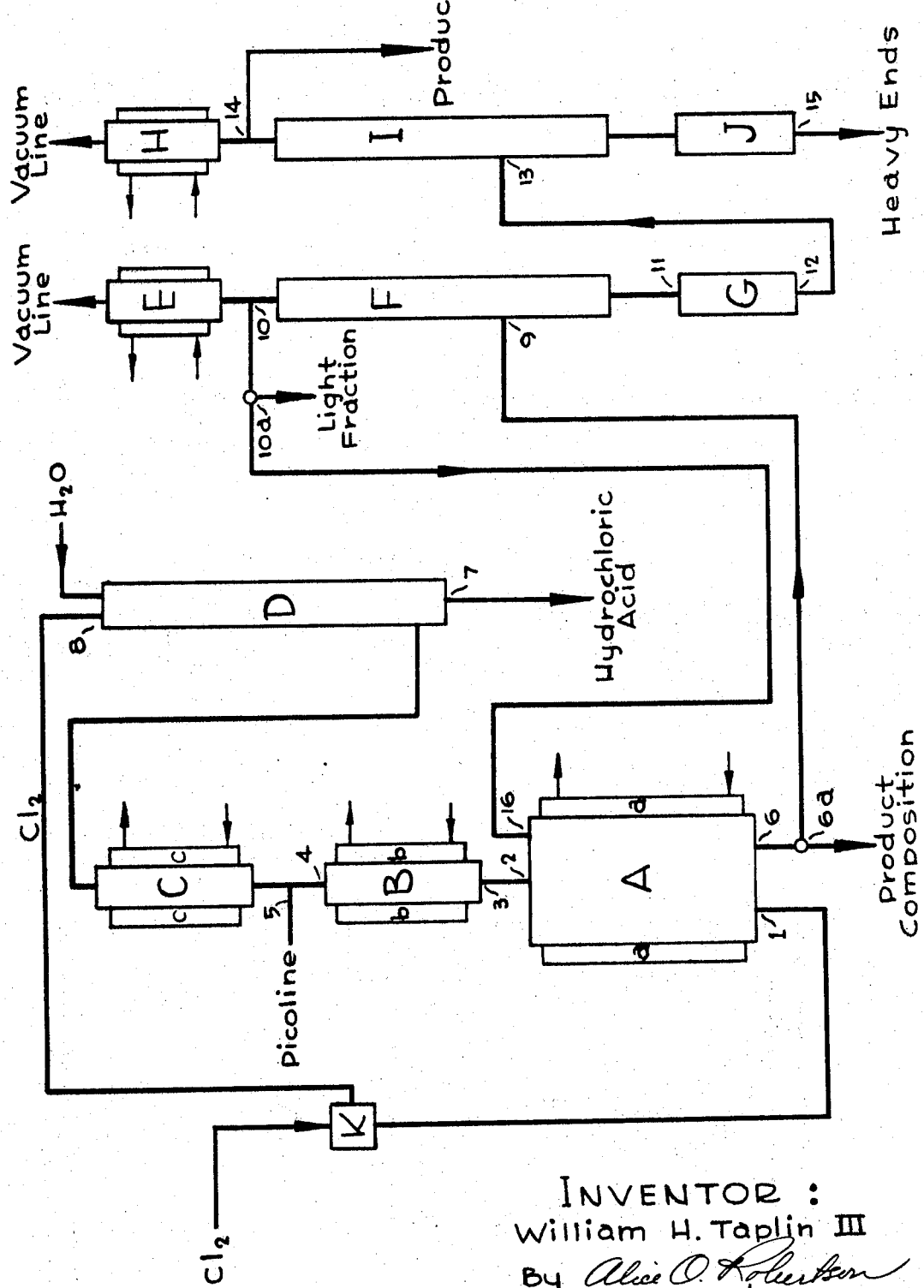

3,424,754
PROCESS FOR 2-CHLORO-6-(TRICHLOROMETHYL) PYRIDINE COMPOSITION
William H. Taplin III, Concord, Calif., assignor to The Dow Chemical Company, Midland, Mich., a corporation of Delaware
Continuation-in-part of application Ser. No. 213,691, July 31, 1962. This application May 18, 1966, Ser. No. 563,317
U.S. Cl. 260—290        8 Claims
Int. Cl. C05c *11/00;* C07d *31/26*

ABSTRACT OF THE DISCLOSURE 2-chloro-6-(trichloromethyl)pyridine and compositions enriched in said compound are produced in a stepwise process in which a liquid α-picoline hydrochloride is produced as an essential intermediate from α-picoline and gaseous hydrogen chloride under mild conditions and which intermediate is then contacted and reacted with gaseous chlorine at elevated temperatures in the absence of added water. These compounds are useful in soil culture, particularly in improving agricultural soil by retarding oxidation of ammonium ions in soil and thereby improving plant nutrition therein.

---

This application is a continuation-in-part of my prior application Ser. No. 213,691, filed July 31, 1962, now abandoned.

This invention relates to chlorination and more particularly to methods for selectively preparing certain chlorinated picoline compounds.

Chlorination of α-picoline to obtain selectively a single component in high yields is not known in the art. Moreover, the existing literature is void of any suggestion that even selected groups of compounds may be prepared by direct chlorination of picoline. It has now been discovered that chlorination of picoline may be carried out in a manner to produce a mixture enriched in a particular chlorinated product. It has further been discovered that chlorination may be carried out in a manner to produce high yields of a single component.

2-chloro-6-(trichloromethyl)pyridine and compositions enriched in 2-chloro-6-(trichloromethyl)pyridine have highly useful properties which are adapted to be employed in agricultural applications. Compositions comprising 2-chloro-6-(trichloromethyl)pyridine find unusual application in soil culture, particularly in improving agricultural soil by retarding oxidation of ammonium ions in soil thereby improving plant nutrition therein. In view of the beneficial properties of 2-chloro-6-(trichloromethyl)pyridine and compositions thereof, it is desirable that a method be found for producing said compounds, easily and in good yields from a readily available raw material source such as α-picoline.

According to the present invention, it has been discovered that high yields of a mixture enriched in 2-chloro-6-(trichloromethyl)pyridine may be prepared in a continuous process. It has further been discovered that substantially pure 2-chloro-6-(trichloromethyl)pyridine may be prepared in excellent yields by a continuous high temperature chlorination process as hereinafter described. Moreover, the present invention provides a method for preparing 2-chloro-6-(trichloromethyl)pyridine directly from α-picoline in a single continuous process. It has also been found that a mixture enriched in 2-chloro-6-(trichloromethyl)pyridine which may also contain minor proportions of 3,5-dichloro-6-(trichloromethyl)pyridine and 2-(trichloromethyl)pyridine optionally may be prepared.

It has been found that chlorination of α-picoline may be carried out rapidly and economically and with the production of a mixture enriched in 2-chloro-6-(trichloromethyl)pyridine in a process which comprises introducing α-picoline and gaseous chlorine continuously and simultaneously at points substantially removed from one another into a reaction system whereby a reaction takes place in the liquid phase to form the desired product mixture enriched in 2-chloro-6-(trichloromethyl)pyridine. Hereinafter, when the expression "picoline" is employed, it will be intended to designate "α-picoline." The process involves first forming a liquid picoline hydrochloride composition, introducing the composition into a liquid phase system, bubbling gaseous chlorine through the liquid phase system under controlled temperature conditions to produce the desired mixture enriched in 2-chloro-6-(trichloromethyl)pyridine. By "liquid picoline hydrochloride composition" is meant a homogeneous liquid mixture or solution which results when picoline hydrochloride which is normally a solid is brought into contact with excess hydrogen chloride gas. It is to be emphasized that "liquid" in said "liquid picoline hydrochloride composition" is not water and that "liquid picoline hydrochloride composition" is not an aqueous solution but that said "liquid picoline hydrochloride composition" is a homogeneous mixture in the liquid state which results on the interaction of liquid picoline and gaseous hydrogen chloride.

In this process, chlorine gas is introduced into an appropriate, heated liquid system comprising an initiator charge, as hereinafter described, to produce hydrogen chloride gas in situ which is conducted therefrom to a cooled system and contacted with picoline in a countercurrent flow to form a liquid picoline hydrochloride composition which is returned to the heated liquid system whereupon it reacts with gaseous chlorine to produce the desired product composition enriched in 2-chloro-6-(trichloromethyl)pyridine.

The "initiator charge" which is placed in the primary reactor to initiate the process of the present invention is defined as a liquid material which when contacted with gaseous chlorine reacts to produce hydrogen chloride. Although the requirement may be met with innumerable materials, as a practical matter, it is a "picoline charge," and the recommended materials are preformed 2-(trichloromethyl)pyridine or preformed liquid picoline hydrochloride composition which may be prepared by treating picoline with several-fold molar excess of hydrogen chloride. In any case, it is important that the initiator charge be a liquid medium free of solid picoline hydrochloride. Moreover, it is important that the operation throughout be conducted in such a manner that no solid picoline hydrochloride or solid tars enter the reactor; the presence of these solids have been found to aggravate decomposition.

The hydrogen chloride formed in situ is conducted to a cooled secondary reactor which is a partial condenser where under controlled temperature conditions it is contacted with picoline in an atmosphere of excess hydrogen chloride to form liquid picoline hydrochloride composition. It is to be noted that hydrogen chloride from an external source is not inoperable in this step but inasmuch as once the reaction has started there is always an abundant internal supply of hydrogen chloride, a method which contemplates an external supply is impractical. In this step, picoline hydrochloride is formed initially but in the presence of excess hydrogen chloride, a liquid composition is formed. The presence of excess hydrogen chloride and the smooth conversion of picoline to liquid picoline hydrochloride composition under controlled temperature conditions is critical and essential not only for obtaining good yields of the product but also for efficient operation of the present invention. As will be discussed hereinafter in connection with a production system suitable for carrying out the present invention, an efficient means for contacting hydrogen chloride and picoline is in a counter-current flow relationship and the smooth conduction of the resulting material to the primary reactor is achieved by controlling the temperatures in such a manner that a significant proportion of the initial heat of reaction between picoline and hydrogen chloride is removed but wherein a sufficiency of heat is retained to permit formation of a liquid composition and to maintain the composition in a liquid state along the down-flow path to the primary reactor. Achievement of the desired temperature control is best accomplished by employing a reactor of such shape and/or dimensions as to provide a high degree of positive temperature control throughout the reactor. Inasmuch as the reaction of picoline hydrochloride formation is exothermic and there is present chlorine gas which at excess temperatures promote tar formation, it is desirable that the reactor have a relatively large area of cooling surface or walls where the extent of cooling may be externally controlled. A suitable temperature range for carrying out this step is from about 20° to about 70° C. It is essential that significantly higher temperatures be avoided in order that undesirable by-product formation or mechanical difficulties resulting from such by-product formation be prevented. It is also important that temperatures appreciably below 20° C. be avoided to preclude mechanical difficulties resulting from solid picoline hydrochloride separation or from chemical difficulties resulting from solid picoline hydrochloride falling into or being carried into the primary reactor. For the high yields contemplated it is important that solid picoline hydrochloride not be carried into the primary reactor. An average temperature of about 50° C. is convenient. It is also to be noted that unmodified picoline cannot be introduced into the primary reactor in significant amounts in place of the liquid composition obtained as hereinabove described if the same good results are to be achieved. Such change will result in poor yields and frequently intractable mixtures.

The exact rate of introduction of chlorine into the primary reactor depends on the particular size of operation, shape of reactor, whether or not mechanical mixing is employed, etc. For efficient operation it is desirable to provide a sufficiently rapid flow of chlorine gas to assure a rapid conversion of the reactant picoline hydrochloride to the desired product composition, to maintain good agitation and to continuously sweep out of the reactor, the hydrogen chloride. Desirable rates for introduction may be expressed with respect to rate of introduction of the reactant picoline into the reaction system. Such rate is considered to be a ratio of chlorine to picoline of from about 1:1 to about 2:1 on weight basis. Illustrative of a desirable rate is that of from about 4 to 7 pounds of chlorine per hour at a picoline feed rate of from about 2 to 7 pounds per hour when introduced into a 6.4 gallon reactor containing about 4.5 gallons of reaction mixture. The residence time is dependent on volume of reaction mixture and picoline feed rate necessary to hold a steady state. By "steady state" is meant the condition attained when the composition of the reaction mixture is no longer changing significantly. The time necessary to achieve a steady state depends on conditions applied to the system and is readily determined by the skilled in the art. Under conditions above and hereinafter noted, the residence time is from about 17 to 35 hours; under the preferred conditions of operation, the residence time contemplated is about 17 hours.

It is important for the successful selective preparation of a mixture enriched in 2-chloro-6-(trichloromethyl pyridine that careful controls be made of the temperature of the reaction mixture, i.e., the temperature of the primary reactor. It is critical and essential that reasonably high temperatures be maintained in the reactor at all times. Within the operable temperature range of from about 140° to 230° C., further controls may be made to more selectively control the desired product composition. Thus, by judicious choice of temperatures, the operation may be carried out to produce 2-chloro-6-(trichloromethyl)pyridine substantially as the sole product or to produce compositions which may contain 3,5-dichloro-6-(trichloromethyl)pyridine and 2-(trichloromethyl)pyridine in significant but minor proportions. In general, good yields of a mixture enriched in 2-chloro-6-(trichloromethyl)pyridine may be obtained by carrying out the reaction in the temperature range of from about 160° C. to about 220° C. Optimum temperatures for obtaining 2-chloro-6-(trichloromethyl)pyridine is from about 180° to about 190° C. Measurable amounts of 3,5-dichloro-2-(trichloromethyl)pyridine and 2-(trichloromethyl)pyridine may be added to the product composition by lowering the reaction temperature, particularly below about 170° C. It is to be noted that at temperatures below about 140° C., the desired selective product composition is not obtained. Also, at temperatures above about 230° C., there is substantial tar formation.

The reaction may be carried out in the presence of ultraviolet light. It has been found, however, that unlike many chlorination reactions, no advantage is gained thereby. When the reaction is carried out in the presence of light, the light source may double as a source of heat.

The mixture enriched in 2-chloro-6-(trichloromethyl) pyridine thus obtained is a water-white liquid and may contain minor proportions of 3,5-dichloro-2-(trichloromethyl)pyridine and 2-(trichloromethyl)pyridine. The process also may be modified to produce substantially pure 2-chloro-6-(trichloromethyl)pyridine as a single product.

In a modification of the present invention which provides a method for recovering continuously 2-chloro-6-(trichloromethyl)pyridine as a substantially pure product, the chlorination is carried out in the reactor as above set forth, preferably, with reactor temperature in the range of from about 190° to about 210° C. The product mixture is conveyed directly from the reactor and fed into the center of a distillation column operating at a reboiler or pot temperature in the range of 180°–190° C. and at a head temperature in the range of 125°–130° and at a pressure of about 8 to 10 millimeters of mercury absolute (mm. Hg abs.), whereupon a minor proportion of the more volatile 2-(trichloromethyl)pyridine preferentially distills and is obtained in the overhead fraction and the less volatile 2-chloro-6-(trichloromethyl)pyridine and by-products are obtained as the "bottoms" fraction. The bottoms fraction may be withdrawn at the pot temperature or fed without cooling to the center of a second distillation column operating at about 20–22 millimeters of mercury absolute pressure with head temperature of about 150° C. and pot temperature in the range of from about 200°–220° C. to distill and to recover substantially pure 2-chloro-6-(trichloromethyl)pyridine product as an overhead fraction and minor amounts of by-products in the bottom heavy ends fraction. 2-chloro-6-(trichloromethyl)pyridine product thus obtained is a water-white liquid which on cooling to room temperature separates as a white, crystalline solid melting at 60.7°–62° C. without recrystallization. The 2-(trichloromethyl)pyridine which is obtained as an overhead fraction in the first distillation may be recycled to the reactor for further chlorination to 2-chloro-6-(trichloromethyl)pyridine.

The present invention may be modified, if desired, to produce significant and/or recoverable amounts of 3,5-dichloro-3-(trichloromethyl)pryidine. In some operations, a product enriched in 2-chloro-6-(trichloromethyl)pyridine and containing minor but significant amounts of 3,5-dichloro-2-(trichloromethyl)pyridine is desired. For the production of such compositions, the previously described chlorination may be carried out in the temperature range of from about 140° to about 180° C. and the product mixture recovered by continuously withdrawing from the reactor without distillation. A product mixture containing from about 10 to 30 mole percent of 3,5-dichloro-2-(trichloromethyl)pyridine may be obtained by this modification. It is to be noted that the product composition thus obtained may be continuously distilled to recover the components, i.e., 2-chloro-6-(trichloromethyl)pyridine as the overhead fraction and 3,5-dichloro-2-(trichloromethyl)pyridine by further distillation of the heavy ends fraction.

As a further modification of the present invention, it has been discovered that chlorination may be carried out to obtain good yields of 2-chloro-6-(trichloromethyl)pyridine at lower than the above-indicated optimum temperature by carrying out the chlorination in two stages whereby two reactors are set up in tandem and the chlorination product mixture of the first reactor is conveyed to the second reactor and therein chlorinated under similar conditions to obtain a mixture enriched in 2-chloro-6-(trichloromethyl)pyridine. The latter may be recovered by continuous bleeding from the second reactor or may be conveyed to the columns for distillation. By using two stage chlorination, lower temperatures may be employed to produce high yields of the desired product composition without decrease in output. It is to be noted, however, that good yields also may be obtained at the lower temperatures without employing a two stage chlorination, by employing a distillation step as part of the operational procedure whereby the overhead fraction consisting primarily of 2-(trichloromethyl)pyridine is recycled.

The present invention may be described more fully by reference to the accompanying flow sheet.

The apparatus comprises primarily of primary reactor A, reactor B, condenser C, hydrogen chloride absorption column D, gas shunting device K, distillation columns F and I, reboilers G and J, and condensers E and H. Reactor A is the primary reactor to be employed as a liquid phase chlorinator; it is fitted with temperature control means $a$ for heating or cooling and may be fitted with an ultraviolet or other actinic light source. Reactor B, a partial condenser, is a preliminary reactor for converting picoline into a liquid picoline hydrochloride composition suitable for chlorination; it is fitted wth cooling means $b$. The exact dimensions of reactor B are not important but they must be such as to provide sufficient cooling to prevent high temperature oxidation by gaseous chlorine but without excessive cooling as to cause separation of solid picoline hydrochloride. Good results are obtained when the diameter: length ratio is about 1:18 and tap water is used for cooling. Condenser C has for its primary purpose avoidance of entrainment losses of reactant or product with effluent gases; it is fitted with cooling means $c$. A means for avoiding entrainment losses is necessary to obtain good yields contemplated by the method of the present invention; it is to be noted however that a separate condenser unit may not be necessary as shown in the diagram but may become part of an integral design of reactor B. Such modifications would be well-known to the skilled in the art. The hydrogen chloride absorption column D is a means for removing hydrogen chloride from the mixed chlorine-hydrogen chloride gases; it consists of downflowing water which meets the gases in counter-current relationship and aqueous hydrochloric acid is recovered at the bottom of the column. Gas shunting device K is any conventional device usable for joining gases from two sources to a single flow system. Distillation columns F and I are preferably Oldershaw type columns having sieve trays or perforated plates with weir and drain or downcomer between the trays. A 20 tray Oldershaw column has been found useful. However, any suitable column having from 15 to 30 theoretical plates may be used. E and H are conventional water-cooled condensers and G and J are conventional reboilers. The distillation units are fitted to be maintained at reduced pressures.

As a first step in carrying out the reaction, an initiator charge as previously defined, is placed in reactor A. Chlorine gas is continuously introduced into the thus charged reactor A at 1 whereupon a reaction takes place with the evolution of hydrogen chloride gas which together with unreacted chlorine leaves the reactor through inlet-outlet 2 and proceeds upwards through orifice 3 into reactor B. Picoline is introduced at inlet 5 where it proceeds by gravity flow entering cooled reactor B at 4, meeting the hydrogen chloride in a counter-current flow relationship and reacting on the walls thereof to form picoline hydrochloride which in the presence of excess hydrogen chloride is converted into a liquid picoline hydrochloride composition. The temperature in reactor B is controlled so as to prevent oxidative tar formation by action of chlorine on picoline and to maintain the down-flowing liquid picoline hydrochloride composition in a homogeneous liquid state without separation of solid picoline hydrochloride on the walls of the apparatus. The liquid picoline hydrochloride composition enters reactor A where, in the liquid phase and under controlled temperature conditions, it reacts with gaseous chlorine to produce a product composition enriched in 2-chloro-6-(trichloromethyl)pyridine. The product composition may be bled from reactor at 6 and recovered at 6a or withdrawn at 6 and conveyed to distillation columns as hereinafter detailed.

The hydrogen chloride, chlorine gas and entrained liquids leaving reactor B at 4, proceed to condenser C where the entrained liquids are separated from the gases by condensation and returned to reactor B. The gases proceed from the condenser to absorption column D where the gases meet down-flowing water in a counter-current relationship and wherein hydrogen chloride dissolved in the water forming hydrochloric acid which is recovered at 7. The gaseous chlorine proceeds from the absorption column at 8 and proceeds to gas shunting device K where it is joined with fresh chlorine and recycled through the reactor system.

When recovery of pure 2-chloro-6-(trichloromethyl) pyridine is desired, the product composition withdrawn from reactor A at 6 is conveyed to distillation column F, maintained at about 8-10 mm. Hg abs. pressure with pot temperature of about 180°–190° C. and head temperature of about 125°–130° C., and introduced at 9 where the temperature may be from about 125°–190° C. The composition is continuously fractionated to obtain an overhead fraction comprising 2-(trichloromethyl)pyridine and recoverable at 10a, and a composition further enriched in 2 - chloro-6-(trichloromethyl)pyridine as the fraction descending and entering reboiler G at 11. The hot composition is conveyed from the reboiler at outlet 12 to distillation column I, maintained at about 20–22 mm. Hg abs. pressure with pot temperature of about 200°–220° C. and head temperature of about 150° C., and introduced at 13 where the temperature may be from about 150°–220° C. The composition thus introduced into the column is continuously fractionated to obtain substantially pure 2 - chloro-6-(trichloromethyl)pyridine in the overhead fraction recovered at 14 and 3,5-dichloro-2-(trichloromethyl)pyridine and by-products as heavy ends recoverable from reboiler J at 15.

The 2-(trichloromethyl)pyridine obtained as the overhead fraction from the first distillation column at 10 may be withdrawn at 10a but is preferably recycled to reactor A, entering reactor A at 16 for further chlorination.

The following examples illustrate the invention but are not to be construed as limiting.

Example 1

An operation was carried out in an apparatus having a schematic arrangement set forth in the accompanying drawing wherein reactor A was a vessel of 17 liter capacity, reactor B was a water-cooled column 2 inches in internal diameter and 36 inches in length, a condenser C was a water-cooled column 2 inches in diameter and 14 inches in length.

Reactor A was charged with 60 pounds of a mixture of partially chlorinated picoline from a previous run as the initiator charge. The temperature of the charged reactor was then raised to 210° C. and gaseous chlorine introduced at inlet 1 at a rate of about 5.5 to 6.6 pounds per hour. The gaseous chlorine reacted with the partially chlorinated picoline in the initiator charge, forming hydrogen chloride which evolved from the mixture, leaving reactor A at 2 and entering reactor B at 3. Picoline was introduced at inlet 5 at a rate of about 1.1 to 1.2 pounds per hour. The picoline, thus introduced, contacted hydrogen chloride gas in a countercurrent flow relationship and reacted therewith forming picoline hydrochloride which in the presence of excess hydrogen chloride gas formed a liquid picoline hydrochloride composition which proceeded downward into the primary reactor. The liquid picoline hydrochloride composition thus continuously introduced into the chlorination medium of reactor A, reacted with gaseous chlorine which was continuously introduced over a period of 17 hours to produce a product mixture enriched in 2-chloro-6-(trichloromethyl)pyridine. After the steady state was reached, the product mixture of about 80 percent purity was continuously removed from the reactor at 6a at a rate of about 3 pounds per hour without distillation and amounted to 50 pounds. A sample of the product crystallized from methylene chloride-pentane had a melting point of 62.5°–62.9° C. The product had elemental analysis as follows—

Theory: C, 31.20; H, 1.31; Cl, 61.1; N, 6.05. Found: C, 31.23; H, 1.32; Cl, 61.22; N, 5.99.

Another sample, crystallized from pentane and having slightly lower melting point was shown to have substantially identical infrared spectral pattern as an authentic sample prepared by independent synthesis and melting at 64°–65° C. and to be of 98 percent purity on the basis of chromatographic analysis comparison with the pure sample.

Example 2

A continuous chlorination operation was carried out in a manner similar to that described in Example 1, but at 220° C. as reaction temperature. During a period of 15 hours, 18.1 pounds (0.194 pound mole) of α-picoline was introduced and after a residence time of about 18 hours, a product composition enriched in 2-chloro-6-(trichloromethyl)pyridine was bled from the reactor without distillation in a yield of 45.4 pounds. On cooling, the liquid solidified to a cream colored solid melting from 50° to 59° C. The product composition contained about 75 percent volatile materials of which vapor phase chromatographic analysis showed 90.8 percent to be 2-chloro-6-(trichloromethyl)pyridine. This amounts to 68 percent 2-chloro-6-(trichloromethyl)pyridine in the product composition.

Example 3

Employing conditions described in Example 2, 597 pounds of a mixture enriched in 2-chloro-6-(trichloromethyl)pyridine was prepared.

334.4 grams of the product thus obtained was fractionally distilled using a 20 tray, 1 inch Oldershaw column at a reflux ratio of 20:1 to obtain purified 2-chloro-6-(trichloromethyl)pyridine product of 98.5–98.6% purity (by vapor phase chromatographic analysis) which distilled at 136°–137.5° C. and 11 millimeters of mercury pressure and amounted to 52 percent of the total material.

Example 4

In a similar operation but employing a two stage chlorination, picoline was introduced at a rate of 1 pound per hour and chlorine introduced into a chlorinator illuminated with ultraviolet light at a rate of about 4 pounds per hour at a reactor temperature of 190° C. After a residence time of 48 hours, sampling and vapor phase chromatographic analysis of the volatile product showed 80 percent 2-chloro-6-(trichloromethyl)pyridine and 12 percent 2-(trichloromethyl)pyridine. The product mixture was then conveyed to a second reactor illuminated with ultraviolet light and chlorinated at 170° C. at the same chlorine feed rate to obtain 3 pounds of a product mixture further enriched in 2-chloro-6-(trichloromethyl)pyridine and containing as volatiles, 90 mole percent of 2-chloro-6-(trichloromethyl)pyridine and 3 mole percent 2-(trichloromethyl)pyridine as determined by vapor phase chromatographic analysis.

Example 5

Employing the two stage conditions described in Example 4, 250 pounds of a mixture enriched in 2-chloro-6-(trichloromethyl)pyridine was obtained.

240 pounds of the product mixture, estimated by vapor phase chromatographic analysis to contain 84 percent 2-chloro - 6 - (trichloromethyl)pyridine, was continuously vacuum distilled through a 4 inch diameter column containing a distilling section of 20 sieve trays and a stripping section of 20 trays. About 25.5 pounds of product mixture was immediately fed to the reboiler pot and to tray 20 and the distillation initiated. Thereafter, the product mixture at a temperature of about 160°–167° C. was fed in at tray 20 at a rate which averaged about six pounds per hour and the distillation operated at 121°–130° C. at 7.5–9 mm. Hg abs. pressure and reflux ratio of about 6:1 to 24:1 to obtain 27.6 pounds of overhead fraction and 151.7 pounds of product mixture enriched in 2-chloro-6-(trichloromethyl)pyridine.

149.1 pounds of this product at a temperature in the range of from 164°–184° C. was fed into a second column at 131°–133° C. and 8–9 millimeters of mercury pressure at a rate of about 6 pounds per hour and the distillation continued over a temperature and pressure range of 131°–160° C. at 8–25 millimeters of mercury pressure to obtain 111.36 pounds (75 percent yield) of 2-chloro-6-(trichloromethyl)pyridine of 99.5 percent purity as determined by vapor phase chromatographic analysis.

Example 6

In a similar manner, products from several single stage chlorinations which had been carried out at temperatures in the range of from 160° to 180° C. were combined; in the resulting composite mixture, 2-chloro-6-(trichloromethyl)pyridine constituted 51 mole percent of the volatiles as determined by vapor phase chromatographic analysis. About 3 liters of the composite mixture was chlorinated by feeding chlorine gas at a rate of 0.2 pound per hour for 19 hours at temperatures in the range of from 135° to 145° C. while the mixture was illuminated with ultraviolet light to obtain a product enriched in 2-chloro-6-(trichloromethyl)pyridine wherein said 2-chloro-6-(trichloromethyl)pyridine constituted 74.4 percent of the volatiles.

Example 7

Reactor A is charged with 50 pounds of 2-(trichloromethyl)pyridine. The temperature of the reactor is raised to about 190° C. and gaseous chlorine introduced at a rate of 6 pounds per hour whereupon it reacts with the charge to produce hydrogen chloride gas. Picoline is introduced into reactor B at a rate of 1 pound per hour where it reacts with hydrogen chloride to form liquid picoline hydrochloride composition. The latter flows into reactor A to react with gaseous chlorine to produce a mixture enriched in 2 - chloro-6-(trichloromethyl)pyridine. After about 100 hours a steady state is reached and the mixture enriched in 2-chloro-6-(trichloromethyl)pyridine is continuously withdrawn from the reactor at the rate of 2.5 pounds per hour and introduced into distilling column F at temperatures in the range of from about 150°–180° C. The mixture is fractionated and there is recovered as overhead fraction distilling at temperatures of from 125°–130° C. at 5–10 mm. Hg abs. pressure at 2-(trichloromethyl)pyridine composition which is conveyed back to reactor A. The mixture further enriched in 2-chloro-6-(trichloromethyl)pyridine flows downward into reboiler G which is maintained at temperatures in the range of 180°–190°. The mixture is then conveyed from the reboiler to midpoint of column I which is at temperatures in the neighborhood of 160°–180° C. to fractionally distill the mixture and to continuously recover at temperatures of 130°–135° C. and 8–10 mm. Hg abs. pressure substantially pure 2-chloro-6-(trichloromethyl)pyridine in the overhead fraction. The product is a clean, colorless liquid which solidifies on cooling to room temperature and has a molecular weight of 231.

Compositions comprising 2-chloro-6-(trichloromethyl)pyridine are useful as nitrification inhibitors. In a representative example of such use, 2-chloro-6-(trichloromethyl)pyridine is dissolved in aqueous ammonium fertilizer composition to produce a soil treating composition containing 1000 parts by weight of nitrogen and 1 part by weight of 2-chloro-6-(trichloromethyl)pyridine. The composition is applied as side dressing to rows of planted corn growing in sandy loam soil with a pH of 7.9 in amounts sufficient to supply nitrogen at rate of 100 pounds per acre. The soil is irrigated with 2 to 4 inches of water during the growing season to produce high yields of marketable corn.

I claim:

1. A process for preparing a mixture enriched in 2-chloro-6-(trichloromethyl)pyridine which comprises
   (1) contacting α-picoline and gaseous hydrogen chloride in a cooled reactor maintained in the temperature range of from about 20° C. to about 70° C. to produce a homogeneous liquid α-picoline hydrochloride composition, and
   (2) contacting in the liquid phase in the absence of added water at substantially elevated temperatures in a range from not less than about 140° C. to not greater than about 230° C., the liquid α-picoline hydrochloride composition and gaseous chlorine;

wherein in the foregoing process, the chlorine and α-picoline are introduced in a ratio of chlorine to picoline of from 1:1 to about 2:1 on a weight basis.

2. A process according to claim 1 wherein the temperature in Step (2) is between about 160° C. to about 220° C.

3. A process according to claim 1 wherein the temperature in Step (2) is between about 180° C. to about 190° C.

4. A continuous process for the preparation of a mixture enriched in 2-chloro-6-(trichloromethyl)pyridine which comprises.
   (1) continuously feeding α-picoline into a cooled reactor maintained in the temperature range of from about 20° C. to about 70° C.,
   (2) contacting substantially instantaneously in said reactor, said α-picoline and gaseous hydrogen chloride to produce a homogeneous liquid α-picoline hydrochloride composition,
   (3) conducting said liquid α-picoline hydrochloride composition from said cooled reactor to a controlled heated reactor maintained in the temperature range of from about 140° C. to about 230° C., and
   (4) continuously feeding gaseous chlorine into said heated reactor and contacting therein in the liquid phase in the absence of added water for time sufficient to complete the reaction, the liquid α-picoline hydrochloride composition and the gaseous chlorine to produce the desired product mixture enriched in 2-chloro-6-(trichloromethyl)pyridine;

wherein in the foregoing process, the chlorine and α-picoline are introduced in a ratio of chlorine to α-picoline of from about 1:1 to about 2:1 on a weight basis.

5. A process according to claim 4 wherein the temperature in Step (3) is from about 160° C. to about 220° C.

6. A process according to claim 4 wherein the temperature in Step (3) is from about 180° C. to about 190° C.

7. A process according to claim 6 wherein the product mixture enriched in 2-chloro-6-(trichloromethyl)pyridine is continuously withdrawn from the reactor.

8. A continuous process for preparing 2-chloro-6-(trichloromethyl)pyridine which comprises
   (1) charging a heated reactor with a picoline charge,
   (2) continuously passing gaseous chlorine therethrough to produce gaseous hydrogen chloride,
   (3) conducting gaseous hydrogen chloride from the heated reactor to a cooled reactor maintained in the temperature range of from about 20° C. to about 70° C.,
   (4) continuously feeding α-picoline into said cooled reactor to contact and react with the gaseous hydrogen chloride to form a homogeneous liquid α-picoline hydrochloride composition,
   (5) conducting the liquid α-picoline hydrochloride composition to the heated reactor maintained in the temperature range of from about 180° C. to about 190° C. wherein in the liquid phase in the absence of added water, said liquid α-picoline hydrochloride composition is contacted and reacted with gaseous chlorine to produce a composition enriched in 2-chloro-6-(trichloromethyl)pyridine,
   (6) continuously withdrawing the latter from the reactor and fractionally distilling at reduced pressure to obtain in the overhead fraction 2-(trichloromethyl)pyridine and in the bottom fraction, a composition further enriched in 2-chloro-6-(trichloromethyl)pyridine, and
   (7) recycling the overhead fraction to the heated reactor and fractionally distilling the bottom fraction at reduced pressure to obtain the desired 2-chloro-6-(trichloromethyl)pyridine product as an overhead fraction;

wherein in the foregoing process, the chlorine and α-picoline are introduced in a ratio of chlorine to picoline of from about 1:1 to 2:1 on a weight basis.

References Cited

UNITED STATES PATENTS

| 2,679,453 | 5/1954 | Brett et al. | 71—2.5 |
| 3,135,594 | 6/1964 | Goring | 71—11 |

OTHER REFERENCES

Sell: J. Chem. Soc. 87: 799–801 (1905). Elderfield: Heterocyclic Compounds (Wiley, New York, 1950), vol. I, pp. 507–8.

HENRY R. JILES, *Primary Examiner.*

C. M. SHURKO, *Assistant Examiner.*

U.S. Cl. X.R.

23—154; 71—1, 61, 64, 94; 204—158